(12) United States Patent
Behnke et al.

(10) Patent No.: US 8,954,224 B2
(45) Date of Patent: Feb. 10, 2015

(54) CREATION OF IMAGE DATABASES FOR IMAGE EVALUATION

(75) Inventors: Willi Behnke, Steinhagen (DE); Boris Kettelhoit, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 990 days.

(21) Appl. No.: 12/615,444

(22) Filed: Nov. 10, 2009

(65) Prior Publication Data

US 2010/0121541 A1 May 13, 2010

(30) Foreign Application Priority Data

Nov. 10, 2008 (DE) .......................... 10 2008 056 557

(51) Int. Cl.
  *G06F 11/32* (2006.01)
  *A01D 41/127* (2006.01)
(52) U.S. Cl.
  CPC ................................. *A01D 41/1277* (2013.01)
  USPC ........................... 701/33.4; 701/523; 348/148

(58) Field of Classification Search
  USPC ............ 701/50, 521, 523, 33.4; 348/120, 148
  See application file for complete search history.

(56) References Cited

U.S. PATENT DOCUMENTS

| 5,815,093 | A  | * | 9/1998 | Kikinis ......................... 340/937 |
| 6,119,442 | A  |   | 9/2000 | Hale |
| 6,336,051 | B1 | * | 1/2002 | Pangels et al. .................. 700/50 |
| 6,714,662 | B1 | * | 3/2004 | Benson et al. ................ 382/104 |
| 2005/0102079 | A1 | * | 5/2005 | Hofer et al. ...................... 701/41 |
| 2008/0162004 | A1 | * | 7/2008 | Price et al. ....................... 701/50 |
| 2009/0112389 | A1 | * | 4/2009 | Yamamoto et al. ............. 701/29 |

* cited by examiner

*Primary Examiner* — Joshua Rodden
(74) *Attorney, Agent, or Firm* — Michael J. Striker

(57) ABSTRACT

For creating an image database for an image evaluation procedure, preferably within an agricultural content, the individual images in the image database are generated during the working process of an agricultural working machine by at least one camera system assigned to the agricultural working machine, and the individual images generated by the at least one camera system are linked to specific data on the working process of the agricultural working machine, and every individual image, which is linked to specific data, is stored in the image database in a manner such that it may be repeatedly called up and edited.

20 Claims, 3 Drawing Sheets

CREATION OF IMAGE DATABASES FOR IMAGE EVALUATION

CROSS-REFERENCE TO A RELATED APPLICATION

The invention described and claimed hereinbelow is also described in German Patent Application DE 10 2008 056 557.1 filed on Nov. 10, 2008. This German Patent Application, whose subject matter is incorporated here by reference, provides the basis for a claim of priority of invention under 35 U.S.C. 119(a)-(d).

BACKGROUND OF THE INVENTION

The present invention relates to a method and a device for creating an image database for an image evaluation procedure, preferably within an agricultural context.

Out of the extensive prior art, reference is made here, as an example, to U.S. Pat. No. 6,119,442, in which an agricultural working machine designed as a combine harvester is disclosed; a large number of camera systems used to detect the stream of material passing through the particular working units is assigned to the agricultural working machine, in the region of its working units. A data processing unit which may be used to evaluate the images generated by the various camera systems is also assigned to the agricultural working machine. The data processing unit is designed to generate control signals for the particular working units based on the evaluation of the image information. U.S. Pat. No. 6,119,442 therefore discloses a control/regulating system which optimizes the operating parameters of the working units in a camera-based manner and in real-time operation.

Since enormous quantities of data typically must be analyzed when evaluating image data, systems of this type are limited to simple analyses due to the limited memory capacities and data transmission rates available on the agricultural working machine. This has the disadvantage, in particular, that the complex interrelationships that exist between the working units of the agricultural working machine are not adequately depicted, or that they are depicted with a time delay that is so great that control of the working units is limited.

Due to the large quantities of data to be processed, the image data generated by camera systems are typically not stored, since they are only needed to analyze an instantaneous operating point and to derive optimized operating parameters for the working units. Images generated in this manner contain only a limited amount of information for subsequent analyses, since they depict the flow of crop material in a more or less precise manner, and they do not include any information about the operating states of the working units or about unapparent properties such as the moisture content of the crop material.

SUMMARY OF THE INVENTION

The object of the present invention, therefore, is to avoid the above-described disadvantages of the related art, and, in particular, to provide a method and a device for creating image databases, the image data—which are stored in an image database—of which contain evaluated information, and therefore the image data include information that may also be used for subsequent analyses.

In keeping with these objects and with others which will become apparent hereinafter, one feature of the present invention, resides, briefly stated, in a method for creating an image database for an image evaluation procedure, comprising the steps of generating individual images in the image database during a working process of an agricultural working machine by at least one camera system assigned to the agricultural working machine; linking the individual images generated by the at least one camera system, to specific data on the working process of the agricultural working machine; and storing every individual image which is linked to the specific data in the image database such that it is repeatedly callable up and editable.

Another feature of the present invention resides in a device for creating an image database for an image evaluation procedure, which has a device for implementing the procedure for creating an image database in which evaluation procedure, wherein at least one camera system assignable to an agricultural working machine and generating individual images in the image database during a working process of the agricultural working machine; means for linking the individual images generated by said at least one camera system with specific data on the working process of the agricultural working machine; and means for storing each individual image linked to the specific data in the image database such that it is repeatedly callable up and editable.

Given that the method for creating an image database for an image evaluation procedure includes the features, at least, that the images in the image database are generated during the working process of an agricultural working machine by at least one camera assigned to the agricultural working machine, the individual images generated by the at least one camera are linked to specific data on the working process of the agricultural working machine, and every individual image linked to specific data is stored in the image database in a manner such that it may be repeatedly called up and edited, it is ensured that the image data with an evaluated information content include information that may also be used for subsequent analyses. This has the advantage, in particular, that, in addition to the image information, it is possible to assign information to the particular individual image that is not directly available in the particular image itself, but which is necessary in order to optimally adjust the working units of an agricultural working machine, and so the end result is that the optimization process is improved via this additional information.

In an advantageous embodiment of the present invention, the specific data on the working process of the agricultural working machine are specific data on the agricultural working machine, and/or specific data on the crop material processed by the agricultural working machine, and/or specific data on the territory worked by the agricultural working machine. Given that information regarding the crop material, the agricultural working machine, and environmental information are taken into account when the image database is generated, the information content of the individual images stored in the image database is increased to a considerable extent.

In a further advantageous embodiment of the present invention, the specific data on the agricultural working machine include setting parameters of the working units of the agricultural working machine, the position of the at least one camera system in the agricultural working machine, and the ground speed of the agricultural working machine. The operating parameters of the working units have a substantial influence—the general interactions of which are known—on the quality parameters of the crop material and the efficiency of the agricultural working machine, and therefore information of this type which is assigned to the individual image may simplify the analysis of the image, since these general interrelationships, e.g., the increase in damaged grain that occurs when cylinder speeds are too high, must be depicted in the individual images. The position of the camera in the agricultural working machine has a substantial influence on the quality of the individual image; better image quality results in a much better image evaluation. The ground speed of the agricultural working machine influences the vibration behavior of the camera systems; the stronger vibrations which occur at higher ground speeds result in poorer image quality. Given that the ground speed is linked to the particular individual image as additional information, suitable threshold value filters may be used during image analysis to ensure that the type of image analysis changes as a function of ground speed, and individual images that are generated at excessive ground speeds are disregarded in the image analysis.

In a further advantageous embodiment of the present invention, the specific data on the crop material processed by the agricultural working machine may be the crop material type, the crop material yield, the crop material moisture content, a layer-thickness signal as an indicator of the stand density, and, if the agricultural working machine is designed as a combine harvester, the specific data may be the moisture content of the grain, the portion of non-grain in the crop material, and the portion of damaged grain. This has the advantages, in particular, that crop material information that may not be derived from the image itself, e.g., the moisture content of the crop material, is now also linked to the individual image. In addition, the crop material properties which are detected via sensors, and which are also apparent in the particular image, may also be utilized in the image analysis in order to evaluate the image quality and/or to define the relevant image features, e.g., damaged grain, lost grains, weed seeds, plant parts. With regard for the crop material yield and/or the crop material throughput, a decision may be made based on this information during the image analysis as to whether the minimum crop material throughput required to obtain analyzable image information was present in the moment when the image was generated. If this is not the case, the related individual image may be disregarded in the image analysis.

In a further advantageous embodiment of the present invention, the specific data on the territory worked by the agricultural working machine include position data on the agricultural working machine, the slope of the hillside, and the time of harvest. While position data are typically required for field mapping, the remaining data also directly influence the quality and information content of the individual images that are generated, and therefore this information may also be used during the image analysis to evaluate the image quality.

In an advantageous development of the present invention, the specific data on the working process of the agricultural working machine may also include manually ascertained quality parameters such as the hectoliter weight of the crop material, a manually ascertained moisture content of the grain, and the customer's quality information. Information of this type has the advantage, in particular, that it may be used to calibrate the image evaluation procedure.

In a further advantageous embodiment of the present invention, a large number of camera systems is assigned to the agricultural working machine; the individual images from each camera system are linked to specific data on the working process of the agricultural working machine, and the individual images may be compared to one another in the image evaluation procedure with regard for the particular camera position. A design of this type has the advantage, in particular, that the influence of the camera position may be determined, or optimal camera positions may be defined.

Given that the individual images generated by the at least one camera system are linked in a data processing unit to specific data on the working process of the agricultural working machine, and every individual image linked to specific data is stored—in a manner such that it may be repeatedly called up and edited—in the image database assigned to the data processing unit or in an image database assigned to a central computer, it is ensured that a device, which is structured in this manner, for creating image databases creates image data evaluated information content which includes information which may also be utilized for subsequent analyses. A structure of this type also has the advantage that the image database may be analyzed offline using image evaluation procedures that are more time-consuming but also much more accurate. This also reduces the computing power that must be made available on the agricultural working machine and makes it possible to test various image evaluation procedures while searching for a suitable imago evaluation procedure.

In an advantageous development of the present invention, the specific data on the working process of the agricultural working machine are generated by sensor systems internal to the machine, and/or they are transmitted via GPS to the data processing unit, and/or they may be entered manually via an input unit. Given that information from the most diverse types of information systems may be taken into account, a device of this type may be used in a highly flexible manner, while also ensuring that the information linked to the particular individual image is very extensive.

In a further advantageous embodiment of the present invention, a large number of camera systems is assigned to the agricultural working machine, and therefore specific parameters of the agricultural working machine to be optimized and image data generated especially for this purpose may be taken into account, which results in a faster and more precise optimization of the mode of operation of the agricultural working machine.

Given that, in an advantageous development of the present invention, the specific data on the working process of the agricultural working machine linked to the particular individual image may be edited in the data processing unit and/or the central computer, it is ensured that, depending on the computing power available, the image database according to the present invention is generated directly on the agricultural working machine or in a central computer unit.

Given that the information contained in the image database that was generated has broad applications, it is provided in an advantageous embodiment of the present invention that the image database stored in the data processing unit and/or the central computer may be transmitted to a large number of agricultural working machines and/or stationary computer units, or it may be called up therefrom.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
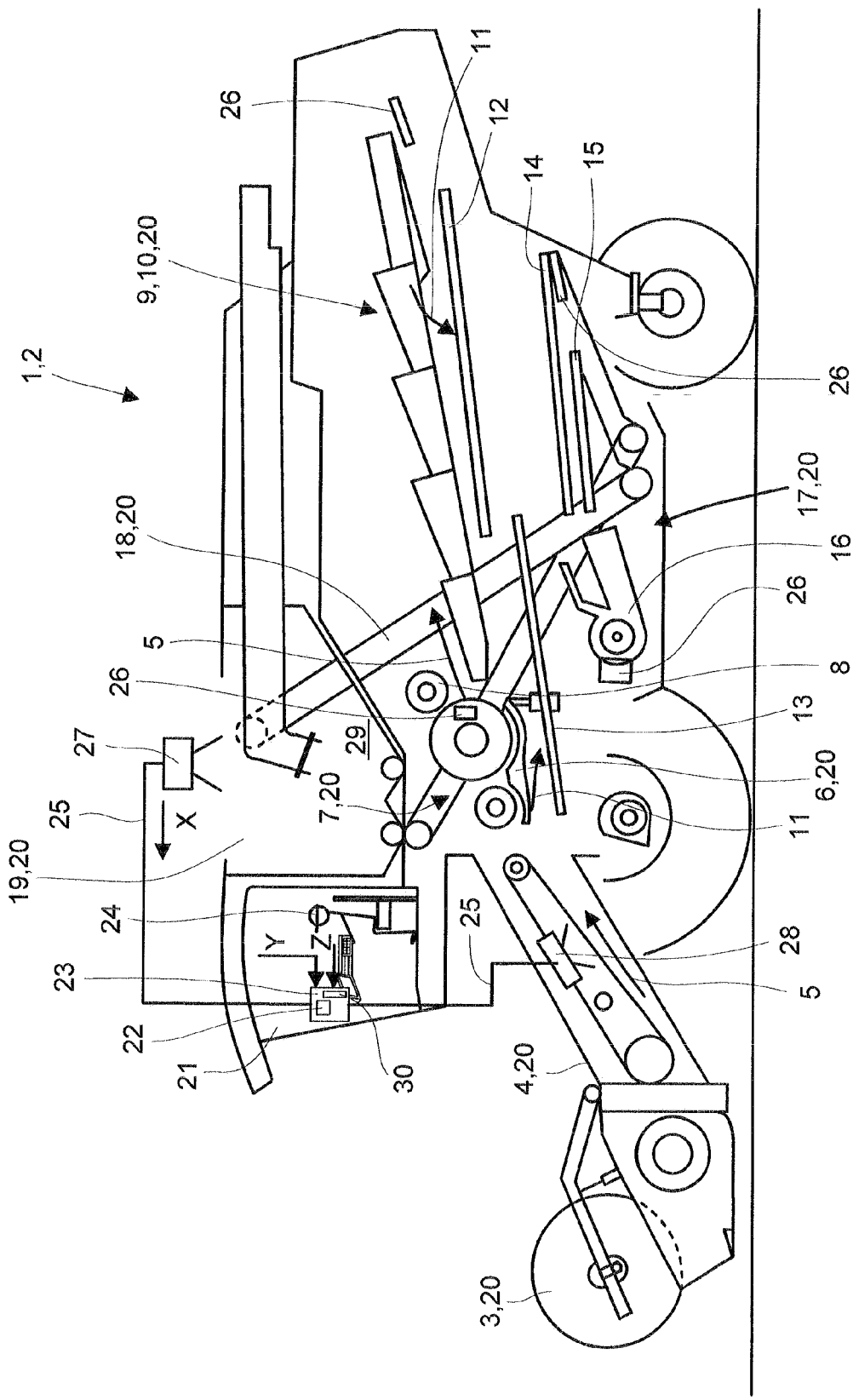
FIG. 1 shows a schematic view of a combine harvester which includes camera systems for generating the image data according to the present invention.

Agricultural working machine 1 which is designed as a combine harvester 2 and is depicted schematically in FIG. 1 includes a grain-cutting device 3 in its front region, which is connected in a manner known per se to feed rake 4 of combine harvester 2. Crop material flow 5 that passes through feed rake 4 is transferred in upper, rear region of feed rake 4 to threshing devices 7 of combine harvester 2, which are at least partially enclosed on the bottom by concave 6. A guide drum 8 situated downstream of threshing devices 7 redirects material flow 5 in the rear region of threshing devices 7 after they exit threshing devices 7 in a manner such that it is transferred immediately to a separating device 10 which is designed as a tray-type shaker 9. Material flow 5 is conveyed on rotating tray-type shaker 9 in a manner such that any unencumbered grains 11 contained in the material flow are separated out in the region underneath tray-type shaker 9. Grains 11 that are separated out at concave 6 and on tray-type shaker 9 are directed via return pan 12 and feed pan 13 to a cleaning device 17 which is composed of several sieve levels 14, 15 and a fan 16. The cleaned flow of grain is then transferred via elevators 18 to a grain tank 19. Grain-cutting device 3, feed rake 4, threshing devices 7 and concave 6 assigned thereto, separating device 10, cleaning device 17, elevators 18, and grain tank 19 are referred to hereinbelow as working units 20 of agricultural working machine 1.

An agricultural working machine 1 that differs from combine harvester 2 depicted here may be any type of agricultural working machine, such as a forage harvester, tractors with attachments, hauling vehicles and the like; it includes a driver's cab 21 in which at least one control/regulating device 23 which includes a display device 22 is located, using which a large number of processes to be described in greater detail may be controlled, the processes being initiated automatically or by operator 24 of agricultural working machine 1. Control/regulating device 23 communicates via a bus system 25 with sensor systems 26 which will be described in greater detail.

To describe the present invention, the combine harvester shown in FIG. 1 includes a first camera system 27 located in grain tank 19, and a further camera system 28 located in feed rake 4. Camera system 27 located in grain tank 19 films the grain flow 29 stored in grain tank 19, while camera system 27 positioned in feed rake 4 detects crop material flow 5 passing through feed rake 4. It lies within the scope of the present invention for combine harvester 2 to include only one of the camera systems 27, 28 shown, or a large number of further camera systems that are not depicted. Camera systems 27, 28 are connected via lines or wirelessly to bus system 25 of combine harvester 2, and via bus system 25 to control/regulating device 23 to facilitate data exchange. Control/regulating device 23 includes a data processing unit 30 in which image data X from camera systems 27, 28, sensor signals Y from various sensor systems 26, external information signals Z, such as GPS signals, and information that has been entered by operator 24 or called up from external databases may be processed, edited, and stored. Data processing device 30 may be designed such that control signals S, which are generated based on image data X, sensor signals Y, and external information Z, or only a portion of these signals, and which are used directly to control one or more working units 20, are transmitted to sensor systems 26 assigned to particular working units 20 in a manner that is known per se and is therefore not described in detail.

Figure 2:
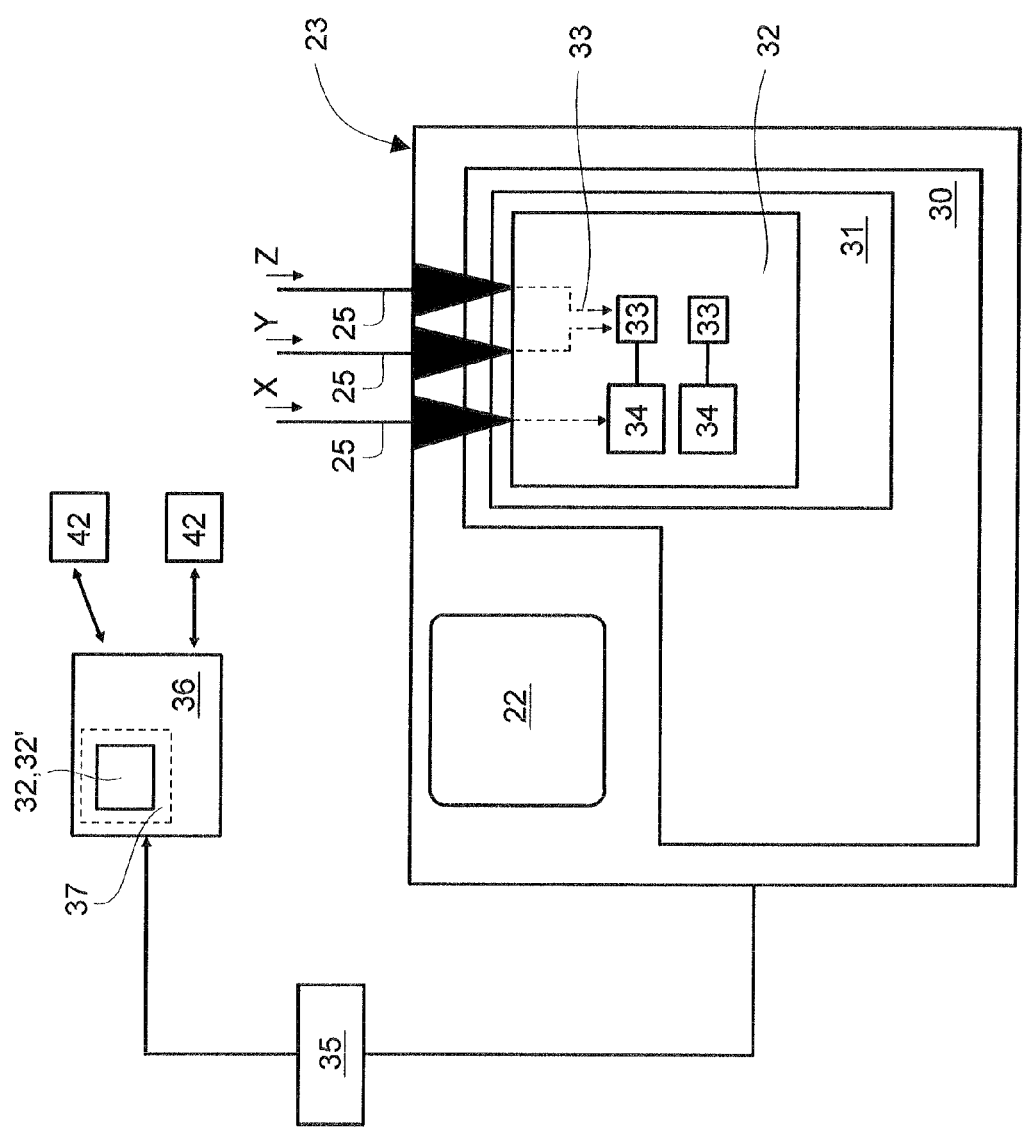
FIG. 2 shows a schematic illustration of the generation of the image database according to the present invention.

In a manner known per se, data processing unit 30, which is assigned to control/regulating device 23 and is shown in FIG. 2, is designed such that it includes a memory unit 31 for generating an image database 32 to be described in greater detail. To create image database 32 according to the present invention, data processing unit 30 accesses—depending on the desired information content of image database 32—image data X, sensor signals Y and external information Z that were transmitted to it; the data extracted from sensor signals Y and/or external information Z are specific data 33 on the working process of agricultural working machine 1. In data processing unit 30, individual images 34 are extracted from image data X, and they are stored in image database 32 in a manner such that they may be repeatedly called up and edited. At the same time, every individual image 34 is linked to the specific data 33 on the working process of agricultural working machine 1 that were ascertained in the moment when individual image 34 was generated, and therefore individual images 34 that were ultimately linked to particular specific data 33 on the working process of agricultural working machine 1 are stored in image database 32 according to the present invention in a manner such that they may be repeatedly called up and edited.

In a first embodiment of the present invention, individual images 34, which are linked to specific data 33 on the working process of agricultural working machine 1, may be stored for the interim on a memory card 35 and transmitted therewith to a central computer 36, e.g., a "farm PC" that belongs to a farmer. It is within the scope of the present invention for individual images 34 linked to specific data 33 on the working process of agricultural working machine 1 to also be transmitted wirelessly to a central computer 26. In addition, due to the limited amount of memory capacity available on the agricultural working machine, individual images 34 and specific data 34 on the working process of agricultural working machine 1 may be transmitted, separated from one another and possibly in an "online" manner, to central computer 36; image database 32 according to the present invention is generated in central computer 36. In central computer 36, image database 32 stored there may be analyzed using a suitable image evaluation procedure 37 which is known per se and will therefore not be described in greater detail, and which is typically based on a special software for image evaluation. It is within the scope of the present invention for specific data 33 on the working process of agricultural working machine 1 assigned to particular individual image 34 to be edited during the analysis process, or for more information to be added. In this manner it is possible to generate an information-enriched image database 32' in central computer 36. In addition, image database 32, 32' stored in central computer 36 or edited therein may be called up by third parties 42 via central computer 36, or it may be transmitted from central computer 36 to third parties 42. A data exchange of this type has the main advantage that the generated information may be reused by a wide circle of users, and possibly during an on-going harvesting process.

Figure 3:
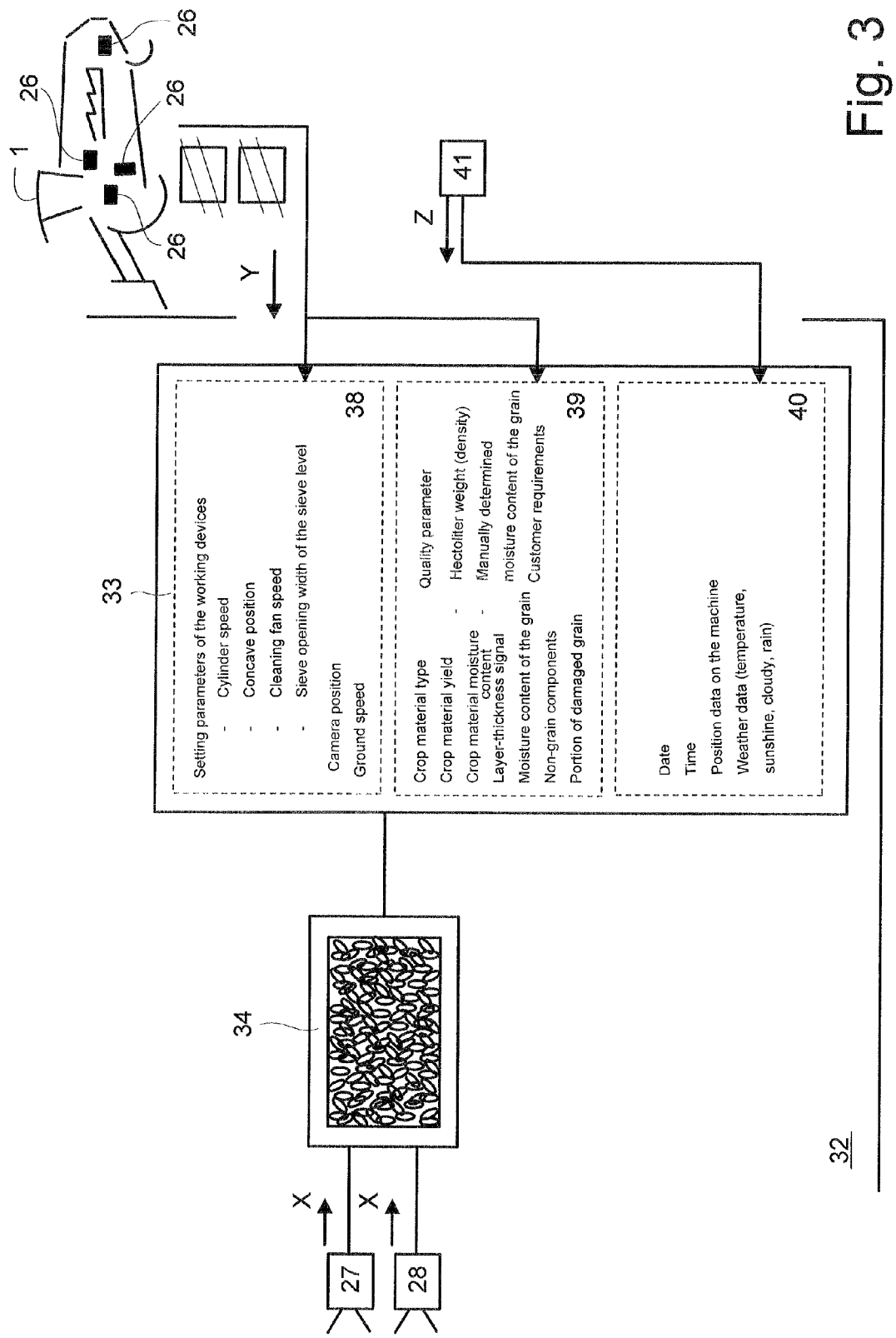
FIG. 3 shows a detailed view of the image database according to the present invention.

In FIG. 3, the information content of individual images 34 and specific data 33 on the working process of agricultural working machine 1 assigned thereto, and the generation of the contents of specific data 33 are described in greater detail in a schematic manner. While individual image 34 is extracted from image data X generated by camera system(s) 27, 28, specific data 33 on the working process of agricultural working machine 1 are derived from sensor signals Y and external information Z. Mainly, specific data 33 may be subdivided into specific data 38 on agricultural working machine 1, specific data 39 on crop material 5 processed by agricultural working machine 1, and specific data 40 on the territory worked by agricultural working machine 1. Depending on the desired content of specific data 38-40, sensor signals Y from sensors 26 located on the agricultural working machine, or information Z obtained from an external information source 41 and transmitted to agricultural working machine 1 are used to generate specific data 38-40.

For example, external information source 41 may include a GPS system for determining the position of the agricultural working machine, information that may be entered by operator 24 of agricultural working machine 1, e.g., the time of harvest as defined by the date and time, or information that may be called up from external databases, e.g., weather databases. In this context, it lies within the scope of the present invention for information Z, which is preferably provided by external information source 41, to also include manually ascertained quality parameters such as the hectoliter weight of the crop material, the density of the crop material, a manually ascertained moisture content of the grain, and the customer's quality information.

Via sensors 26 which are known per se and are therefore not described here in technical detail, and which are located in agricultural machine 1, it is possible to gather specific data 39 on crop material 5 processed by agricultural working machine 1, such as the crop material type, the crop material yield, the crop material moisture content, a layer-thickness signal as an indicator of the stand density, and, if agricultural working machine 1 is designed as a combine harvester 2, the moisture content of the grain, the portion of non-grain in the crop material, and the portion of damaged grain.

Specific data 38 on agricultural working machine 1 which are ascertained using further sensors 26 which are also known per se and are located on agricultural working machine 1 may include, in general, the setting parameters of working units 20 of agricultural working machine 1, the position of camera system(s) 27, 28 in agricultural working machine 1, and the ground speed of agricultural working machine 1. If agricultural working machine 1 is designed, e.g., as combine harvester 2, then it is possible to assign the following to its working units in a manner known per se: speed sensors 26 for determining the rotational speed of threshing parts 7, position sensors 26 for determining the position of concave 6, rotational speed sensors 26 for determining the rotational speed of cleaning fan 16, and position sensors 26 for determining the sieve opening width of sieve levels 14, 15.

Given that specific data 33 on the working process of agricultural working machine 1 which are linked to particular individual image 34 include an information content that far exceeds the information content of individual image 34, substantially more accurate image analyses may be performed using an image database 32 designed in this manner.

It will be understood that each of the elements described above, or two or more together, may also find a useful application in other types of methods and constructions differing from the types described above.

While the invention has been illustrated and described as embodied in the creation of image databases for image evaluation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method, executed by a data processing unit with a memory, for creating an image database for an image evaluation procedure, comprising the steps of
    generating individual images during a working process in an agricultural working machine by at least one camera system assigned to the agricultural working machine, the individual images of crop material processing during the working process;
    linking, using the data processing unit, the individual images generated by the at least one camera system, to specific data on the working process of the agricultural working machine; and
    storing, using the data processing unit, every individual image linked to the specific data on the working process in the image database such that the individual images linked to the specific data on the working process are repeatedly callable up and editable during the image evaluation procedure;
    wherein the specific data on the working process linked to any of the individual images includes a ground speed of the agricultural working machine.

2. The method for creating an image database as defined in claim 1, further comprising
    using, as the specific data on the working process of the agricultural working machine, specific data selected from the group consisting of specific data on the agricultural working machine, specific data on a crop material processed by the agricultural working machine and specific data on a territory being worked by the agricultural working machine.

3. The method for creating an image database as defined in claim 2, further comprising
    including in the specific data on the agricultural working machine, specific attributes selected from the group consisting of setting parameters of working units of the agricultural working machine, a position of the at least one camera system in the agricultural working machine, and a ground speed of the agricultural working machine.

4. The method for creating an image database as defined in claim 2, further comprising
    including in the specific data on the crop material processed by the agricultural working machine, specific attributes selected from the group consisting of a crop material type, a crop material yield, a crop material moisture content, a layer-thickness signal as an indicator of a stand density, and optionally, if the agricultural working machine is a combine harvester, a moisture content of a grain, a portion of non-grain in the crop material, and a portion of damaged grain.

5. The method for creating an image database as defined in claim 2, further comprising
    including in the specific data on the territory worked by the agricultural working machine, specific attributes selected from the group consisting of position data of the agricultural working machine, a slope of a hillside, and a point in time when harvesting is carried out.

6. The method for creating an image database as defined in claim 2, further comprising
    including in the specific data on the working process of the agricultural working machine, specific attributes selected from the group consisting of manually ascertained quality parameters of the crop material, a manually ascertained hectoliter weight of the crop material, a manually ascertained moisture content of a grain, and a customer's quality information.

7. The method for creating an image database as defined in claim 1, further comprising
assigning the agricultural working machine a plurality of said camera systems, linking the individual images of each of said camera systems to specific data on the working process of the agricultural working machine; and
comparing the individual images to one another in the image evaluation procedure with regard for a particular camera position.

8. The method defined by claim 1, further comprising using an individual, stored image in the image evaluation procedure including the specific data on the working process linked thereto, where necessary.

9. The method defined by claim 1, further comprising using an individual, stored image in the image evaluation procedure, during which the linked specific data are modified or added to.

10. A device for creating an image database for an image evaluation procedure, comprising
at least one camera system assignable to an agricultural working machine and generating individual images in the image database during a working process of the agricultural working machine, the individual images of crop material processing during the working process;
means for linking the individual images generated by said at least one camera system with specific data on the working process of the agricultural working machine; and
means for storing each individual image linked to the specific data on the working process in the image database such that the individual image is repeatedly callable up and editable during the image evaluation procedure;
wherein the specific data on the working process linked to any of the individual images includes a ground speed of the agricultural working machine.

11. The device for creating an image database for an image evaluation procedure as defined in claim 10, wherein said means for storing are selected from a group consisting of a data processing unit and a central computer to which the image database is assigned.

12. The device for creating an image database for an image evaluation procedure as defined in claim 11, further comprising
means for providing the specific data on the working process of the agricultural working machine selected from the group consisting of sensor systems which are internal to the machine and generate a specific data, GPS via which the specific data are transmitted to the means for storing and an input unit manually entering the specific data.

13. The device for creating an image database for an image evaluation procedure as defined in claim 10, wherein a plurality of said camera systems is assigned to the agricultural working machine.

14. The device for creating an image database for an image evaluation procedure as defined in claim 11, wherein the means for storing is configured so that the specific data on the working process of the agricultural working machine which are linked to the particular individual images are editable in the means for storing.

15. The device for creating an image database for an image evaluation procedure as defined in claim 11, further comprising further means selected from the group consisting of
means for transmitting the image database stored in said data processing unit or in said central computer to a component selected from the group consisting of a plurality of agricultural working machines, two stationary computer units and means for calling the image database therefrom.

16. The device defined by claim 10, further comprising means for implementing the image evaluation procedure to utilize the stored image and where necessary, the specific data on the working process linked thereto.

17. The device defined by claim 10, further comprising means for implementing the image evaluation procedure that utilizes the stored image, including modifying or adding to the linked specific data.

18. A method, executed by a central computer with a memory, for creating an image database for an image evaluation procedure, comprising the steps of
generating individual images during a working process in an agricultural working machine by at least one camera system assigned to the agricultural working machine, the individual images of crop material processing during the working process;
linking, using the central computer, the individual images generated by the at least one camera system, to specific data on the working process of the agricultural working machine; and
storing, using the central computer, every individual image linked to the specific data on the working process in the image database such that the stored individual images are repeatedly callable up and editable during the image evaluation procedure;
wherein the specific data on the working process linked to any of the individual images includes a ground speed of the agricultural working machine.

19. The method defined by claim 18, further comprising using an individual, stored image in the image evaluation procedure including the specific data on the working process linked thereto, where necessary.

20. The method defined by claim 18, further comprising using an individual, stored image in the image evaluation procedure, during which the linked specific data are modified or added to.

* * * * *